United States Patent [19]

Gaku et al.

[11] Patent Number: 4,585,855

[45] Date of Patent: Apr. 29, 1986

[54] PROCESS FOR PRODUCING CURABLE RESIN COMPOSITION FROM CYANATE ESTER AND MALEIMIDE/DIAMINE REACTION PRODUCT

[75] Inventors: Morio Gaku, Saitama; Hidenori Kimbara; Mitsuo Ejiri, both of Tokyo, all of Japan

[73] Assignee: Mitsubishi Gas Chemical Company, Inc., Tokyo, Japan

[21] Appl. No.: 706,981

[22] Filed: Feb. 28, 1985

[30] Foreign Application Priority Data

Mar. 2, 1984 [JP] Japan ................................ 59-40217
Mar. 2, 1984 [JP] Japan ................................ 59-40218
Mar. 2, 1984 [JP] Japan ................................ 59-40219
Aug. 27, 1984 [JP] Japan ................................ 59-178066

[51] Int. Cl.$^4$ ............................................. C08F 283/00
[52] U.S. Cl. ............................... 528/322; 525/326.7; 525/374; 525/421; 525/426; 528/86; 528/170; 528/172; 528/211; 528/248; 528/253
[58] Field of Search .................. 528/322, 86, 170, 172, 528/211, 248, 253; 525/421, 426, 326.7, 374

[56] References Cited

U.S. PATENT DOCUMENTS 4,110,364 2/1978 Gaku et al. ........................ 528/170
4,499,245 2/1985 Ikeguchi et al. .................... 528/322

*Primary Examiner*—Harold D. Anderson
*Attorney, Agent, or Firm*—Browdy and Neimar

[57] ABSTRACT

A process for producing a curable resin liquid comprising: (a) at least one cyanate ester compound and (b) at least one polyfunctional maleimide compound, characterized in that the process comprises:

(A) reacting at least one said maleimide compound with said diamine in the presence of a diluent at a temperature of 60°–200° C., the ratio of the maleimide group to the amine group being in the range of from 1:0.0015 to 1:0.3 to form a preliminary reaction product substantially free from amine group; and (B) mixing said preliminary reaction product with at least one cyanate ester compound ratio by weight of said preliminary reaction product to said cyanate ester compound is disclosed.

11 Claims, No Drawings

PROCESS FOR PRODUCING CURABLE RESIN COMPOSITION FROM CYANATE ESTER AND MALEIMIDE/DIAMINE REACTION PRODUCT

BACKGROUND OF THE INVENTION

The present invention relates to a novel process for producing a curable resin having excellent heat resistance, molding property, chemical resistance, adhering property, moisture resistance and the like.

U.S. Pat. No. 4,110,364 dated Aug. 29, 1978 by Gaku et al discloses that curable resin compositions comprising a cyanate ester compound and a polyfunctional maleimide compound have excellent heat resistance, chemical resistance, adhering property, moisture resistance and the like. However, the curable resin composition containing large amount of polyfunctional maleimide component does not become uniform, because the solubility of the maleimide component in an organic solvent is poor. So workability of the curable resin composition containing a large amount of maleimide component is poor.

When a polyfunctional amine is added to the curable resin composition comprising a polyfunctional cyanate ester and a polyfunctional maleimide as a hardening agent, the resulting composition has poor storage stability, because the amine easily reacts with the cyanate ester or the maleimide. When a preliminary reaction of the curable resin composition comprising a polyfunctional cyanate ester, a polyfunctional maleimide and a polyfunctional amide is caused, the amine rapidly reacts with the maleimide and imine carbonate ester linkage is formed by reacting the amine with the cyanate ester. So the resulting cured product has poor heat resistance and the curable composition has poor storage stability.

Though a curable resin composition comprising a polyfunctional cyanate ester, a polyfunctional maleimide and trialkenyl isocyanurate (diluent) has excellent heat resistance, chemical resistance, adhering property, moisture resistance and the like, solubility of the composition in an organic solvent is poor. So the curable composition with high level of cyanate ester component or maleimide component can not be used.

In a process for producing a curable resin composition which comprises reaction a polyfunctional maleimide with a polyfunctional amine and incorporating epoxy resin into the resulting reaction product, the reaction needs a solvent, because of rapid reaction of the maleimide and the amine. So, according to the process, curable resin composition free from a solvent can not be obtained.

SUMMARY OF THE INVENTION

The present inventors have made research to overcome the above mentioned shortcomings. As a result, we found a process for producing curable resin composition having excellent heat resistance, moisture resistance, chemical resistance, electric properties, mechanical strengthes and the like.

The present invention relates to a process for producing a curable resin liquid comprising:

(a) at least one cyanate ester compound selected from the group consisting of:
(i) polyfunctional aromatic cyanate ester monomers having the formula:

$$R(\!\!-\!\!O\!\!-\!\!C\!\!\equiv\!\!N)_n$$

wherein n is integer of 2–10 and R is an aromatic organic group, the cyanate groups being bonded to an aromatic ring of said aromatic organic group, and
(ii) homoprepolymers of (i), and
(b) at least one polyfunctional maleimide compound from the group consisting of (i) a polyfunctional maleimides having 2 or more N-maleimide group per one molecule, (ii) homopolymers of maleimide of (i) and (ii) copolymers of maleimide of (i) and a diamine; characterized in that the process comprises:
(A) reacting at least one said maleimide compound with said diamine in the presence of a diluent at a temperature of 60°–200° C., the ratio of the maleimide group to the amine group being in the range of from 1:0.0015 to 1:0.3 to form a preliminary reaction product substantially free from amine group; and
(B) mixing said preliminary reaction product with at least one said cyanate ester compound ratio by weight of said preliminary reaction product to said cyanate ester compound being in the range of 90:10–1:99.

DETAILED DESCRIPTION OF THE INVENTION

Polyfunctional maleimide compounds employed as one of the components constituting a curable resin composition of this invention have at least 2 maleimide groups in the molecule and are represented by the following general formula

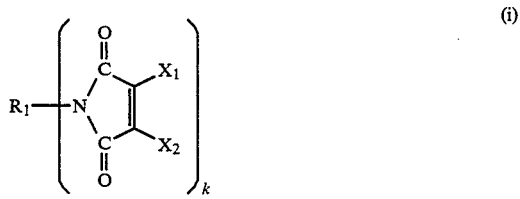

wherein $R_1$ represents an aromatic or aliphatic organic group having a valence of k, $X_1$ and $X_2$ are the same or different and are independently a hydrogen atom, halogen atom or lower alkyl group and k is an integer of at least 2 and preferably an integer of 2–10. Oligomers or prepolymers derived from the above maleimide compounds may be used as the maleimide compound. Polyvalent, aromatic or aliphatic organic groups represented by $R_1$ in formula (i) include the following:
(i) aliphatic or alicyclic hydrocarbon groups having 4–16 carbon atoms,
(ii) polyvalent groups derived from aromatic hydrocarbons having benzene or naphthalene ring, such as benzene, xylene or naphthalene,
(iii) polyvalent groups derived from compounds in which at least 2 benzene rings are directly bonded, such as biphenyl,
(iv) aromatic ring-containing groups resulting from bonding of a plurality of benzene rings either directly or through a bridging member, represented by the formula

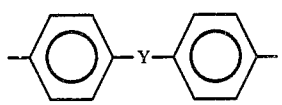

wherein Y represents a linear, branched or cyclic aliphatic hydrocarbon group having 1 to 14 carbon atoms, aromatic hydrocarbon group, such as a phenylene group, a xylylene group, an oxygen atom, a sulfur atom, a carbonyl group, a sulfonyl group, a sulfinyl group, an alkyleneoxyalkylene group a phosphonyl group, a phosphinyl group or an imino group,
(v) melamine residues, and
(vi) residues of polynuclear product of benzene obtained by reacting aniline with formaldehyde, generally residues of polynuclear product having 2–10 benzene rings.

The maleimides represented by the above formula (i) can be produced by a method known per se which involves reacting maleic anhydride with divalent or more polyamine having at least 2 amino groups to form a maleamide acid, and then dehydro-cyclizing the maleamide acid. The maleimide can be produced by known methods per se.

Examples of polyfunctional maleimide include 1,3- or 1,4-dimaleimide benzene, 1,3- or 1,4-bis(maleimido methylene) benzene, 1,3- or 1,4-dimaleimido cyclohexane, 1,3- or 1,4-bis(maleimidomethylene)cyclohexane, 4,4-dimaleimido biphenyl, bis(4-maleimidophenyl)methane, bis(4-maleimidophenyl)ether, bis(4-maleimidophenyl)sulfone, bis(4-maleimido-3-methylphenyl) methane, bis(4-maleimido-3-chlorophenyl)methane, bis(4-maleimido-3,5-dimethylphenyl)methane, 2,2-bis(4-maleimido-3-methylphenyl)propane, 2,2-bis(4-maleimido-3,5-dibromophenyl) propane, bis(4-maleimidophenyl)phenylmethane, 3,4-dimaleimidophenyl-4'-maleimidophenylmethane, 1,1-bis(4-maleimidophenyl)-1-phenyl-methane, maleimide derived from melamine and maleimide derived from addition product of formalin and an aniline in which two or more benzene rings bond through methylene group.

The diamines include aromatic diamines, alicyclic diamines aliphatic diamines. Aromatic diamines are preferable, because the resulting object product have excellent heat resistance. When an alicyclic diamine is used the object products having flexibility. Primary diamines are more preferable to secondary diamines.

Examples of the amines include meta- or para-phenylenediamine, meta- or para-xylylenediamine, 1,4- or 1,3-cyclohexanediamine, hexahydroxylylenediamine, 4,4'-diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl)methane, bis(4-amino-3,5-dimethylphenyl)methane, bis(4-aminophenyl)cyclohexane, 2,2-bis(4-aminophenyl)propane, 2,2-bis(4-amino-3-methylphenyl) propane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane, bis(4-aminophenyl)diphenyl silane, bis(4-aminophenyl)methyl phosphoneoxide, bis(3-aminophenyl)methyl phosphoneoxide, bis(4-aminopheynl)phenyl phosphineoxide, 2,4-diamino-6-phenyl-1,3,5-triazine (benzoguanamine), methylguanamine and butylguanamine.

The diamines represented by the formula

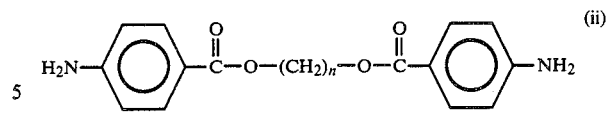

wherein n is integer of 2–8 can be used.

The diluents include organic solvents and reactive diluents. Examples of the organic solvents include acetone, methyl ethyl ketone, chloroform, diethyl ether, methyl dibutyl ketone, cyclohexanone, dioxane, tetrahydrofuran, ethyl acetate, acetnitrile, dimethyl formamide, dimethyl acetamide, diethylene glycol dimethyl sulphoxide, N-methyl-2-pyrrolidone, toluene, xylene and butyl phthalate. Dimethyl formamide and N-methyl-2-pyrrolidone are preferable.

It is critical that the reactive diluents dissolve the polyfunctional maleimide compounds and the diamines, and do not react with both the maleimide compound and the diamine during reacting the maleimide compound and the diamine. Examples of the reactive diluents include trialkenyl isocyanurate, tris(2-acryloxyethyl)isocyanurate, methacrylate esters, diallyl phthalate and the like. Trialkenyl isocyanurate and tris(2-acryloxyethyl)isocyanurate are preferable.

The ratio of the maleimide group of the maleimide to the amino group of the diamine is in the range of 1:0.0015–1:0.3, preferably 0.008–0.25 and most preferably 0.011–0.11.

The diluent can be used in amount of 10–200 parts by weight per 100 parts by weight of the maleimide. When the diluent is trialkenyl cyanurate, the diluent can be used in amount of 5–40 parts by weight per 100 parts of the maleimide.

The reaction of the maleimide and the diamine may be effected at a temperature of 60°–200° C., preferably 80°–170° C. most preferably 100°–165° C. for 0.5–24 hours, and preferably 0.5–10 hours not so as to form the gel. When the temperature exceeds 160° C., gel is formed before uniform composition is formed. When the temperature is less than 60° C., the reaction does not sufficiently proceed.

When the reaction is effected, a radical polymerization inhibitor can be added to the reaction system in order to suppress the radical polymerization of the double bonds in the maleimide. Examples of the polymerization inhibitors include hydroquinone, tertiary-butyl catechol, hydroquinone monomethyl ether, hydroquinone monoethyl ether, benzoquinone, phenothiazine and ditertiary-butyl-hydroxy toluene.

The preliminary reaction of the maleimide and the diamine is necessary so that the malemide monomer crystal does not deposit or so that the deposit of the crystal becomes less. The preliminary reaction suppresses deterioration in the physical properties of the cured products and makes the storage stability of the resin composition by the unreactive diamine better. When the ratio of the amine group to the maleimide group is more than 0.3, the unreactive diamine remains in the composition and the unreactive diamine reacts with the cyanate ester to form imine carbonate linkage which lowers heat resistance of the cured product and the storage stability of the curable resin composition.

When the reaction temperature between the maleimide and the diamine exceeds 200° C., the mixture forms gel before forming uniform preliminary reaction product. When the reaction temperature is less than 60° C., the reaction proceeds very slowly.

By "polyfunctional cyanate ester" is meant a compound having at least two cyanate groups in its molecule. The polyfunctional cyanate ester is represented by the formula

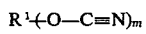

wherein $R^1$ is an aromatic nucleus-containing residue having 1–10 benzene rings selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

wherein $R^2$ and $R^3$ are the same or different and each represents a hydrogen atom or an alkyl group containing 1 to 4 carbon atoms,

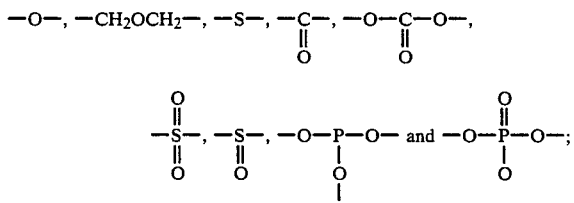

said aromatic nucleus is optionally substituted by a substituent selected from the group consisting of alkyl groups containing 1 to 4 carbon atoms, alkoxy groups, containing 1 to 4 carbon atoms, chlorine and bromine; m is in an integer of at least 2 and preferably 2–10, and the cyanate group is always directly bonded to the aromatic nucleus.

Examples of the polyfunctional cyanate ester include 1,3- or 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4′-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-dibromo-4-cyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak (U.S. Pat. No. 4,022,755, U.S. Pat. No. 3,448,079 etc.); cyanated bisphenol type polycarbonate oligomer derived from bisphenol type polycarbonate oligomer (U.S. Pat. No. 4,026,913) and mixture thereof. Other cyanate esters employed in the practice of this invention are given in U.S. Pat. Nos. 3,553,244; 3,755,402; 3,740,348; 3,595,900; 3,694,410 and 4,116,946 and BP Nos. 1,305,967 and 1,060,933 which are incorporated herein by reference. Of these cyanate esters, divalent cyanate ester compounds which are derived from divalent phenols, have symmetric structure and do not have any condensed ring in their bridging portion, such as, for example, 2,2-bis(4-hydroxyphenyl)propane, are preferable, because they are commercially available and give cured product having excellent properties. Polycyanate compounds obtained by reacting a phenol-formaldehyde precondensate with a halogenated cyanide are also satisfactory. The above-mentioned cyanate esters may be used as mixtures.

Prepolymers may be used containing a sym-triazine ring which is prepared by the trimerization of the cyanate groups of the cyanate ester, and which have a number average molecular weight of 300 to 6,000. Such prepolymers can be prepared by polymerizing the above cyanate esters in the presence or absence of, as a catalyst, an acid such as a mineral acid or Lewis acid, a base such as sodium hydroxide, a sodium alcoholate or a tertiary amine, a salt such as sodium carbonate or lithirium chloride, or phosphate esters, such as tributyl phosphine.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

The ratio of the preliminary reaction product between the maleimide and the diamine to the cyanate ester compound is in the range of 1:99–90:10 preferably 10:90–80:20 and most preferably 35:65–80:20.

The above-mentioned diluent may be added to the curable resin composition comprising the preliminary reaction product of the maleimide and the diamine and the cyanate ester compound. The curable resin composition may be heated to form the preliminary reaction product between the maleimide and the cyanate ester compound.

Reticulation of the curable resin composition produced according to this invention may occur by heating.

A curable resin composition of the present invention may contain a catalyst or catalysts for the purpose of accelerating reticulation.

Examples of the catalysts include imidazoles, such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogene-N,N-dimethylaniline, 2-N-ethylanilino ethanol, tri-n-butylamine, pyridine, quinoline, N-methylvorpholine, triethanolamine, triethylenediamine, N,N,N′,N′-tetramethylbutanediamine, N-methylpiperidine; phenols, such as phenol, cresol, xylenol, resorcine, and phloroglusin; organic metal salts, such as lead naphthanate, lead stearate, zinc naphthanate, zinc octoate, tin oleate, dibutyl tin maleate, manganese naphthenate, cobalt naphthenate, and acetyl acetone iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, lauric anhydride, pyromellitic anhydride, trimetllitic anhydride, hexahydrophthalic anhydride, hexahydropyromellitic anhydride and hexahydrotrimellitic anhydride; azo compounds, such as azoisobutylonitrile, 2-2'-azobispropane, m,m'-azoxystyrene, hydrozones, and mixtures thereof.

A variety of additives in such an amount that the properties of the product do not change may be added to the resin composition in order to obtain suitable viscosity of the composition or to improve adhesion, curing characteristics and flexibility of the composition. Examples of such additives include polyvinyl acetal resin, such as polyvinyl formal, and polyvinyl butyral; thermoplastic urethane resins; rubbers, such as polybutadiene, butadiene-acrylonitrile copolymer, polychloropryrene, butadiene-styrene copolymer, polyisoprene, butyl rubber and natural rubbers; vinyl compound polymers, such as polyethylene, polypropylene, polybutene, poly-4-methyl pentene-1, polyvinyl chloride, polyvinylidene chloride, polystyrene, polyvinyl toluene, polyvinyl phenol, AS resin, ABS resin, MBS resin, poly-tetrafluoroethylene, fluorinated ethylene-propylene copolymers, tetrafluoroethylene-hexafluoropropylene copolymer, and polyfluorinated vinylidene; resins, such as polycarbonate, polyester carbonate, polyphenylene ether, polysulfone, polyester, polyether sulfone, polyamide and polyphenylene sulphite; and low molecular substance having molecular weight less than 10,000 of the above mentioned resins.

The temperature for curing the curable resin composition depends on the presence or the absence of a catalyst and the kind and the proportion of components constituting the resin composition. In general, the temperature may be in the range of 100°-250° C. The curable resin compositions of the present invention can be used for the various purposes. When they are used as moldings, laminates, and the like. The composition may be cured under a pressure of 1-500 Kg/cm$^2$, and preferably 5-150 Kg/cm$^2$.

The present invention is further illustrated by the following non-limiting Examples and Comparative Runs.

All percentages and parts in these Examples and Comparative Runs are by weight, unless otherwise specified.

EXAMPLE 1

Step (A) Preliminary reaction between maleimide and diamine

Bis(4-maleimidophenyl)methane (900 gram, 2.51 mol), trimethylene-bis(4-aminobenzoate) (100 g, 0.32 mol) and N,N-dimethyl formaldehyde (hereinunder be referred to as DMF) (429 g) were mixed; and preliminary reaction between bis(4-maleimidophenyl)methane and trimethylene-bis(4-aminobenzoate) was carried out at 150° C. for 3.5 hours to form a prepolymer solution.

Step (B) Mixing the above preliminary reaction product with a cyanate ester compound The prepolymer of 2,2-bis(4-cyanatophenyl)propane was prepared. The resulting prepolymer (250 g) and DMF (594 g) were mixed with the preliminary reaction product of (A) at 80° C. for 1 hour.

Step (C) Preparation of laminate

Zinc octoate (0.5 g) was added to the resin solution. A glass cloth 0.2 mm thick was impregnated with the solution and heated to obtain B-staged prepreg.

Eight layers of the prepregs were sandwiched between two copper foils 35 micron thick, and pressed at 50 Kg/cm$^2$ and 180° C. for 2 hours and then at 230° C. for additional 24 hours to produce a two side copper-clad laminate.

The performances of the laminate are set forth in Table 1.

EXAMPLES 2–10

The procedures of Example 1 were repeated by using components and conditions as given in Table 1. The results are shown in Table 1.

COMPARATIVE RUN 1

Bis(4-maleimidophenyl)methane (900 g, 2.51 mol), trimethylene-bis(4-aminobenzoate) (100 g, 0.32 mol) and DMF (429 g) were mixed. 2,2-Bis(4-cyanatophenyl)propane and DMF were added to the mixture. The resulting solution precipitated at room temperature.

Zinc octoate (0.2 g) was added to the resin solution, and a glass cloth 35 mm thick was impregnated with the solution and heated to obtain B-staged prepreg, while agitating the solution.

Eight layers of the prepregs were sandwiched between two copper foils 35 micron thick, and pressed at 50 Kg/cm$^2$ and 180° C. for 2 hours and then at 230° C. for additional 24 hours to produce a two side copper-clad laminate.

The performances of the laminate are set forth in Table 2.

COMPARATIVE RUN 2

The procedure of Example 1 was repeated except that trimethylene bis(4-aminobenzoate) was not used. Gelation of the reaction mixture was rapidly caused 45 minutes after the reaction. The resin solution could not be obtained.

COMPARATIVE RUN 3

Bis(4-maleimidophenyl)methane (900 g, 2.51 mol), bis(4-aminophenyl)methane (100 g, 0.51 mol) and DMF (429 g) were mixed. Prepolymer of 2,2-bis(4-cyanatophenyl)propane was prepared by heating the monomer at 150° C. for 1 hour. The prepolymer (250 g) and DMF (594 g) were mixed with the mixture at 80° C. for 1 hour. The mixture formed precipitate at room temperature.

Zinc octoate (0.6 g) and dicumyl peroxide (1.2 g) were added to the resin solution. A glass cloth 0.2 mm thick was impregnated with the solution, while stirring the solution, and heated to obtain B-staged prepreg.

Eight layers of the prepregs were sandwiched between two copper foils 35 micron thick, and pressed at 50 Kg/cm$^2$ and 180° C. for 2 hours and then at 240° C. for additional 24 hours to produce a two side copper-clad laminate.

The performances of the laminate are set forth in Table 2.

COMPARATIVE RUN 4

The procedure of Example 7 was repeated except that bis(4-aminophenyl)sulfone was not used. The resulting resin solution was precipitated at room temperature.

The performances of the laminate are set forth in Table 2.

COMPARATIVE RUN 5

Bis(4-maleimidophenyl)methane (970 g), benzoquanamine (30 g), hydroquinone (1 g) and DMF (429 g) were mixed. 2,2-Bis(4-cyanatophenyl)propane (538 g) and DMF (829 g) was added to the mixture and stirred at 150° C. for 5 minutes, and cooled to obtain resin solution. The solution formed precipitate at 25° C.

Zinc octoate (0.6 g) and dicumyl peroxide (1.2 g) were added to the resin solution. A glass cloth 0.2 mm thick was impregnated with the solution while stirring the solution and heated to obtain B-staged prepreg.

Eight layers of the prepregs were sandwiched between two copper foils 35 micron thick, and pressed at 50 Kg/cm$^2$ and 180° C. for 2 hours and then at 240° C. for additional 24 hours to produce a two side copper-clad laminate.

The performances of the laminate are set forth in Table 2.

COMPARATIVE RUN 6

The procedure of Example 10 was repeated except that benzoquanamine was not used. The resulting solution formed precipitate.

The result is shown in Table 2.

EXAMPLE 11

Bis(4-maleimidophenyl)methane (100 g, 0.28 mol), bis(4-aminophenyl)methane (5 g, 0.025 mol) and triallyl isocyanurate (20 g) were mixed; and preliminary reaction between bis(4-maleimidophenyl)methane and bis(4-aminophenyl)methane was carried out at 145° C. for 2 hours to form a prepolymer solution. Prepolymer of 2,2-bis(4-cyanatophenyl)propane was prepared by heating the monomer at 150° C. for 1 hour. The resulting prepolymer (67 g) was mixed with the preliminary reaction product at 120° C. for 1 hour and cooled to obtain a brown, clear resin solution (3,400 poises at 30° C.). The resin solution was charged into a mold, and cured at 150° C. for 2 hours and then at 180° C. for additional 20 hours to obtain molding plate 4 mm thick. The performances of the plate are set forth in Table 1.

DMF was added to the resin solution to obtain a solution with resin level of 55%. Zinc octoate (0.05 g) and dicumyl peroxide (0.1 g) were added to the resin solution. A glass cloth 0.2 mm thick was impregnated with the solution and heated to obtain B-staged prepreg.

Eight layers of the prepregs were sandwiched between two copper foils 35 micron thick, and pressed at 50 Kg/cm$^2$ and 180° C. for 2 hours and then at 240° C. for additional 24 hours to produce a two side copper-clad laminate.

The performances of the laminate are set forth in Table 1.

EXAMPLE 12

The procedure of Example 9 was repeated by using the components and conditions in Table 1. The results are shown in Table 1.

COMPARATIVE RUN 7

The procedure of Example 11 was repeated except that triallyl isocyanurate was not used. The uniform solution coul not be obtained at a reaction temperature of 145° C. When the preliminary reaction was carried out at 160° C., the solution was gelled in 15 minutes.

COMPARATIVE RUN 8

Bis(4-maleimidophenyl)methane (100 g, 0.28 mol), isocyanurate (20 g) were mixed; and when preliminary reaction of bis(4-maleimidophenyl)methane and bis(4-aminophenyl)methane was carried out at 145° C. for 2 hours, gel was rapidly formed. The reaction was carried out at 120° C. for 2 hours to form a solution. Prepolymer of 2,2-bis(4-cyanatophenyl)propane was prepared by heating the monomer at 150° C. for 1 hour. The prepolymer (67 g) was mixed with the mixture at 150° C. for 2 hours, and cooled to obtain a yellowish brown, obscure resin paste.

COMPARATIVE RUN 9

Bis(4-maleimidophenyl)methane (100 g), 2-2-bis(4-cyanatophenyl)propane (67 g) and triallyl isocyanurate (20 g) were mixed. The preliminary reaction between bis(4-malemidophenyl)methane and 2,2-bis(4-cyanatophenyl)propane was carried out 145° C. for 2 hours, and cooled to obtain a yellowish brown, obscure resin solution having viscosity of 31,000 poises at 30° C.

The molding and the laminate were prepared in the same was as Example 9. In this case, the impregnating step was effected while stirring the solution. The results are shown in Table 2.

COMPARATIVE RUN 10

Bis(4-maleimidophenyl)methane (100 g, 0.28 mol), bis(4-aminophenyl)methane (5 g, 0.0025 mol), triallyl isocyanurate (20 g) were mixed. 2,2-Bis(4-cyanatophenyl)propane was added to the mixture and the preliminary reaction between bis(4-maleimidophenyl)methane and 2,2-bis(4-cyanatophenyl) propane was carried out at 150° C. for 1 hour. Though the resulting prepolymer were mixed at 120° C. for 1 hour, uniform solution could not be formed. Large amount of bis(4-maleimidophenyl)methane deposited from the solution, and the mixture was substantially solid.

The procedure of molding step of Example 9 was repeated except that the molding temperature was 120° C.

It attempted to prepare prepreg in the same was as Example 11. However, uniform varnish could not be obtained.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
| --- | --- | --- | --- | --- | --- | --- | --- | --- | --- | --- | --- | --- |
| Components of Step (A) | M-1 | M-1 | M-1 | M-1 | M-1 | M-1 | M-1 | M-1 | M-1 | M-1 | M-1 | M-1 |
|  | 900 g | 900 g | 970 g | 900 g | 950 g | 900 g | 990 g | 950 g | 970 g | 900 g | 100 g | 100 g |
|  | 2.51 mol | 2.51 mol | 2.71 mol | 2.51 mol | 2.65 mol | 2.51 mol | 2.77 mol | 2.65 mol | 2.71 mol | 2.51 mol | 0.28 mol | 0.28 mol |
|  | A-1 | A-1 | A-1 | A-1 | A-1 | A-3 | A-4 | A-3 | A-2 | A-2 | A-3 | A-2 |
|  | 100 g | 100 g | 30 g | 80 g | 10 g | 100 g | 10 g | 50 g | 30 g | 100 g | 5 g | 1 g |
|  | 0.32 mol | 0.32 mol | 0.10 mol | 0.25 mol | 0.53 mol | 0.51 mol | 0.046 mol | 0.25 mol | 0.159 mol | 0.53 mol | 0.025 mol | 0.0053 mol |
|  |  |  |  | A-2 20 g |  |  |  |  |  |  |  |  |

TABLE 1-continued

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| | D-1 429 g | D-1 429 g | D-3 429 g | 0.25 mol D-1 429 g R-1 1 g | D-1 429 g R-1 1 g | D-1 429 g | D-3 429 g R-1 1 g | D-1 429 g | D-1 429 g R-1 1 g | D-3 429 g | D-5 20 g | D-5 30 g |
| maleimide group/amine group | 1/0.128 | 1/0.128 | 1/0.07 | 1/0.199 | 1/0.069 | 1/0.2 | 1/0.171 | 1/0.094 | 1/0.059 | 1/0.211 | 1/0.089 | 1/0.023 |
| Components of step (C) | C-1 250 g D-1 429 g | C-1 250 g D-1 41 g E-1 50 g | C-2 667 g D-4 682 g | C-1 1000 g D-1 1207 g | C-1 538 g D-1 829 g | C-1 250 g D-1 594 g | C-2 667 g D-1 682 g | C-1 1000 g D-1 1207 g | C-1 538 g D-1 829 g | C-2 250 g D-1 594 g | C-1 67 g | C-1 150 g |
| Catalyst of Step (C) | cata-1 0.5 g | cata-1 0.5 g | cata-1 0.5 g | cata-1 1 g cata-2 2 g | cata-1 1 g cata-2 2 g | cata-1 0.6 g cata-2 1.2 g | cata-1 0.6 g cata-2 1.2 g | cata-1 0.6 g cata-2 1.2 g | cata-1 0.6 g cata-2 1.2 g | cata-1 0.6 g cata-2 1.2 g | cata-1 0.05 g cata-2 0.1 g | cata-1 0.05 g cata-2 0.1 g |
| Conditions of Step (A) temp. (°C.) | 150 | 150 | 150 | 130 | 140 | 120 | 130 | 130 | 120 | 120 | 145 | 160 |
| time (hr.) | 3.5 | 3.5 | 5 | 3 | 4 | 2 | 2 | 2.5 | 7 | 2 | 2 | 1 |
| Conditions of Step (B) temp. (°C.) | 80 | 80 | 130 | 80 | 80 | 80 | 130 | room temp. | 80 | 100 | 120 | 140 |
| time (hr.) | 1 | 1 | 1 | 1 | 1 | 1 | 1 | 1 | 1 | 0.5 | 1 | 1 |
| Properties viscosity of resin solution | | | | | | | | | | | 3400 poises | 12000 poises |
| Glass transition temperature (°C.) | 292 | 292 | 280 | 272 | 285 | 321 | 295 | 279 | 295 | 316 | 241 | 220 |
| Copper foil peel strength (Kg/cm) | 1.60 | 1.60 | 1.50 | 1.55 | 1.50 | 1.75 | 1.55 | 1.60 | 1.60 | 1.55 | 1.70 | 1.65 |
| Solder resistance (300° C./2 min.) | O | O | O | O | O | O | O | O | O | O | O | O |
| Organic solvent resistance*1 | O | O | O | O | O | O | O | O | O | O | O | O |
| Decrease in weight after heating (%)*2 | | | | | | | | | | | 2.8 | 3.4 |
| Flexural strength of molding plate (Kg/mm$^2$) | | | | | | | | | | | 11.5 | 10.4 |
| moisture resistance*3 | | | | | | | | | | | O | O |

"O" in properties . . . no damage
"X" in properties . . . blister
*1 Appearance after the test sample was immersed in 1,1,1-trichloroethylene for 15 minutes.
*2 After the molding plate (50 mm × 50 mm × 4 mm) was heated at 260° C. for 240 hours, the plate weighed.
*3 Appearance after the copper foil was removed from the laminate and was left to stand in steam at 120° C. and 2 atoms for 70 hours.

The symbols in Table 1 represent the following:
M-1 . . . bis(4-maleimidophenyl)methane
A-1 . . . trimethylene bis(4-aminobenzoate)
A-2 . . . benzoguanamine
A-3 . . . bis(4-aminophenyl)methane
A-4 . . . bis(4-aminophenyl)sulfone
D-1 . . . N,N-dimethyl formamide (DMF)
D-3 . . . N-methyl pyrrolidone (NMP)
D-4 . . . dimethyl acetamide
D-5 . . . triallyl isocyanurate
C-1 . . . prepolymer of 2,2-bis(4-cyanatophenyl)propane
C-2 . . . 2-bis(4-cyanatophenyl)propane
cata-1 . . . zinc octoate
cata-2 . . . dicumyl peroxide
E-1 . . . novolak type epoxy resin (The Dow Chemical Co.; DEN-438)
R-1 . . . hydroquinone (radical polymerization inhibitor).

TABLE 2

| Properties | Comp. Run 1 | Comp. Run 3 | Comp. Run 4 | Comp. Run 7 | Comp. Run 8 | Comp. Run 9 | Comp. Run 10 |
|---|---|---|---|---|---|---|---|
| Viscosity of resin solution | | | | | | 31000 poises | |
| Glass transition temperature (°C.) | 281 | 316 | 283 | 290 | 294 | 234 | 236 |
| Copper foil strength (Kg/cm) | 1.50 | 1.40 | 1.40 | 1.60 | 1.50 | 1.40 | — |
| Solder resistance (300° C./2 min.) | X | X | O | O | O | O | — |
| Organic solvent resistance*1 | O | O | O | O | O | O | O |
| Decrease in weight after heating (%)*2 | | | | | | 2.9 | 3.0 |
| Flexural strength of molding plate (Kg/mm$^2$) | | | | | | 10.2 | 11.0 |

TABLE 2-continued

| Properties | Comp. Run 1 | Comp. Run 3 | Comp. Run 4 | Comp. Run 7 | Comp. Run 8 | Comp. Run 9 | Comp. Run 10 |
|---|---|---|---|---|---|---|---|
| Moisture resistance*3 | | | | | | O | — |

"O" ... no damage;
"X" ... blister
*1 Appearance after the test sample was immersed in 1,1,1-trichloroethylene for 15 minutes.
*2 After the molding plate (50 mm × 50 mm × 4 mm) was heated at 260° C. for 240 hours, the plate weighed.
*3 Appearance after the copper foil was removed from the laminate and was left to stand in steam at 120° C. and 2 atoms for 70 hours.

What is claimed is:

1. A process for producing a curable resin liquid comprising:
   (a) at least one cyanate ester compound selected from the group consisting of:
      (i) polyfunctional aromatic cyanate ester monomers having the formula $$R-(O-C\equiv N)_n$$

wherein n is an interger of 2-10 and R is an aromatic organic group, the cyanate group bonded to an aromatic ring or said aromatic organic group, and
      (ii) homoprepolymer of (i), and
   (b) a preliminary reaction product of (1) a diamine and (2) at least one polyfunctional maleimide compounds, wherein the process comprises
      (A) reacting said at least one maleimide compound with said diamine in the presence of a diluent at a temperature of 60°-200° C., the ratio of the maleimide group to the amine group being in the range of from 1:0.0015 to 1:0.3 to form a preliminary reaction product substantially free from amine group; and
      (B) mixing said preliminary reaction product with at least one said cyanate ester compound in a weight ratio of said preliminary reaction product to said cyanate ester compound of about 90:10 to 1:99.

2. The process of claim 1 wherein the ratio of the maleimide group to the amino group is in the range of from 1:0.008 to 1:0.25.

3. The process of claim 1 wherein the ratio of the maleimide group to the amine group is in the range of from 1:011 to 1:0.11.

4. The process of claim 1 wherein the ratio of said preliminary reaction product to said cyanate ester compound is in the range of from 35:65 to 80:20.

5. The process of claim 1 wherein said diamine is at least one diamine selected from the group consisting of aromatic diamines, aliphatic diamines, alicyclic diamine, alkylene-bis(4-aminobenzoate), 6-alkyl- or aryl-substituted guanamins, and mixtures thereof.

6. The process of claim 5 wherein said diamine is alkylene bis(4-aminobenzoate).

7. The process of claim 5 wherein said diamine is an aromatic diamine.

8. The process of claim 1 wherein said diluent is an organic solvent.

9. The process of claim 1 wherein said diluent is a reactive diluent which has at least one carbon-carbon double bond and does not substantially react with the diamine and the maleimide during reacting said maleimide compound with said diamine.

10. The process of claim 8 wherein said organic solvent is N,N-dimethyl formamide.

11. The process of claim 9 wherein said reactive diluent is trialkenyl isocyanurate or tris(2-acryloxy)isocyanurate.

* * * * *